US012478934B2

(12) United States Patent
Ballhause et al.

(10) Patent No.: US 12,478,934 B2
(45) Date of Patent: Nov. 25, 2025

(54) SHAKING PLATFORM HAVING AN ADJUSTABLE HOLDING DEVICE FOR CONTAINER FASTENING, HOLDING DEVICE AND LABORATORY SHAKING DEVICE

(71) Applicant: Thermo Electron LED GmbH, Langenselbold (DE)

(72) Inventors: Norman Ballhause, Osterode (DE); Mike Armbrecht, Osterode (DE)

(73) Assignee: Thermo Electron LED GmbH, Langenselbold (DE)

( * ) Notice: Subject to any disclaimer, the term of this patent is extended or adjusted under 35 U.S.C. 154(b) by 749 days.

(21) Appl. No.: 17/700,930

(22) Filed: Mar. 22, 2022

(65) Prior Publication Data

US 2022/0331760 A1 Oct. 20, 2022

(30) Foreign Application Priority Data

Apr. 19, 2021 (DE) ..................... 10 2021 002 036.7

(51) Int. Cl.
*B01F 31/20* (2022.01)
*B01F 31/22* (2022.01)
*B01F 101/23* (2022.01)

(52) U.S. Cl.
CPC ............ *B01F 31/201* (2022.01); *B01F 31/22* (2022.01); *B01F 2101/23* (2022.01)

(58) Field of Classification Search
CPC ...... B01F 31/201; B01F 31/22; B01F 29/321; B01F 29/322; B01F 35/421; B01L 2201/021; B01L 9/50
See application file for complete search history.

(56) References Cited

U.S. PATENT DOCUMENTS 5,540,901 A 7/1996 Riley
5,639,354 A 6/1997 Zellweger
(Continued)

FOREIGN PATENT DOCUMENTS

DE 2250442 A1 4/1974
DE 102014106553 A1 11/2015
(Continued)

OTHER PUBLICATIONS

Edmund Buhler GMBH, Operating instructions shaker, www.edmund-buehler.de, Version Jan. 2016 (18 pages) (Year: 2016).*
(Continued)

*Primary Examiner* — Elizabeth Insler
(74) *Attorney, Agent, or Firm* — BakerHostetler

(57) ABSTRACT

The present invention relates to a shaking platform for a laboratory shaking device having an adjustable holding device for fastening at least one container, the shaking platform having a length and a width, and the holding device comprising: a base plate having a fastening device for fastening the holding device on the shaking platform, at least two supports that protrude from the base plate and that form a container-receiving space arranged between the supports, and at least two holding rods carried by the supports and running substantially parallel to the shaking platform, which holding rods delimit the container-receiving space and whose distance from one another can be adjusted via an adjusting rail, the length and the width being greater than a length of the holding rods. The present invention also relates to an adjustable holding device and a laboratory shaking device.

13 Claims, 4 Drawing Sheets

(56) References Cited

U.S. PATENT DOCUMENTS

| | | | | |
|---|---|---|---|---|
| 6,416,455 | B1 * | 7/2002 | Aizawa | B04B 5/0414 494/16 |
| 2016/0175790 | A1 * | 6/2016 | McCarley | B01F 31/24 366/211 |
| 2017/0151508 | A1 | 6/2017 | Carl et al. | |

FOREIGN PATENT DOCUMENTS

| | | | |
|---|---|---|---|
| EP | 1201297 | A1 | 5/2002 |
| EP | 1445307 | A1 | 8/2004 |
| EP | 1949955 | A1 | 7/2008 |
| WO | 2005107931 | A1 | 11/2005 |

OTHER PUBLICATIONS

Edmund Buhler GMBH, Operating Instructions Shaker, www.edmund-buehler.de, Version Jan. 2016 (18 pages).

German Patent Office, Office Action, Application No. 10 2021 002 036.7, dated Oct. 7, 2021 (9 pages).

* cited by examiner

SHAKING PLATFORM HAVING AN ADJUSTABLE HOLDING DEVICE FOR CONTAINER FASTENING, HOLDING DEVICE AND LABORATORY SHAKING DEVICE

CROSS-REFERENCE TO RELATED APPLICATION

The present application claims priority under 35 U.S.C. § 119 of German Patent Application No. 10 2021 002 036.7, filed Apr. 19, 2021, the disclosure of which is hereby incorporated herein by reference in its entirety.

FIELD OF THE INVENTION

The present invention relates to a shaking platform for a laboratory shaking device. In addition, the present invention relates to an adjustable holding device for use with such a shaking platform and to a laboratory shaking device, in particular a laboratory shaker or a shaking incubator, having such a shaking platform or such a holding device.

BACKGROUND OF THE INVENTION

Laboratory shaking devices of the generic type comprise, for example, laboratory shakers and shaking incubators and are used in a large number of laboratories, for example in the field of chemistry, pharmacy, biotechnology, microbiology, and many other fields. They are offered both as small table-top devices and as large, freestanding devices. Devices of this type typically have one or more shaking platforms or trays on which a large number of different containers, for example bottles, Erlenmeyer flasks, microtiter plates, etc., can be stored. The shaking platform is moved at a typically adjustable speed, for example linearly back and forth, rotating in an orbital movement or in a three-dimensional tumbling movement. As a result, the contents of the containers are mixed and/or kept in movement on the shaking platform. In the case of laboratory shakers, the shaking platform is exposed in the laboratory atmosphere or is covered by a lid. Shaking incubators, on the other hand, have an interior space surrounded by a housing, in which usually a plurality of separately or jointly moving shaking platforms is arranged and in which controlled conditions such as a specific temperature and/or air humidity and possibly a specific gas composition prevail. Laboratory shakers and shaking incubators of the generic type are described, for example, in EP 1201297 A1, WO 2005/107931 A1, EP 1445307 A1, and EP 1949955 A1 and are sold by Thermo Fisher Scientific, Inc. under the names "Fisherbrand™ Schüttler," "Thermo Scientific™ Solaris™," and "Thermo Scientific™ MaxQ™."

It is known to provide the shaking platforms of generic devices with different attachments in order to be able to advantageously fasten different containers to the shaking platforms, for example by means of holding clamps, holders, and webs. Typically, different embodiments of holding devices are offered for different container shapes. They are usually fastened to the shaking platforms by means of screws, which shaking platforms have a large number of bores for fastening the holding devices. The holding devices in turn generally comprise a base plate having a fastening device for fastening the holding device on the shaking platform, for example likewise bores through which screws can be inserted. In addition, generic holding devices usually comprise at least two supports that protrude from the base plate and that form a container-receiving space arranged between the supports.

In order to fix containers in the holding devices, it is known that said holding devices have at least two holding rods carried by the supports and running substantially parallel to the shaking platform, which holding rods delimit the container-receiving space and whose distance from one another can be adjusted via an adjusting rail. The containers can then be placed in the container-receiving space and clamped between the holding rods, for which purpose the holding rods are designed to be adjustable. The shaking platforms are typically designed with a rectangular or square basic shape. They have a length and a width. In the prior art, it is customary to form the holding rods over the entire length or the entire width of the shaking platform to be able to fasten containers over the entire length or width of the shaking platform. In particular, a plurality of containers, often four, five or even more containers, are placed in a container-receiving space and clamped between two holding rods. The disadvantage of this, however, is that only containers having exactly the same dimensions can then be fastened between the holding rods. Even in this case, however, it is not uncommon for the holding rods to only really lie firmly against and fix in place a part of the container. It regularly happens that one or more of the containers fixed in place by the two holding rods come loose during operation of the laboratory shaking device. This means that the containers, for example, carry out undesired additional movements that can lead to undesired foam formation in a liquid in the container. In addition, the containers can also be damaged or destroyed, which can lead to contamination or loss of the liquids in the containers. Overall, it is therefore difficult, if not impossible, to fix containers of different sizes in place on shaking platforms using the conventional holding devices. Therefore, if containers of different sizes have to be used with one and the same laboratory shaking device, they must be used one after the other.

In addition, the holding rods are typically locked in place to fix the containers in place with respect to the adjusting rail. In particular, in the case of conventional holding devices, the holding rods of which extend over the entire length and/or width of the shaking platform, the locking devices to be used by an operator for this purpose generally protrude laterally from the holding device and from the container-receiving space. An operator must therefore have access to the shaking platform from all sides, which can be difficult if the laboratory shaking device is in close proximity to other equipment or to a wall. Large containers in particular, which protrude far above the shaking platform, then have to be gripped in an unwieldy manner. Overall, the operation of such locking devices is therefore complicated and, depending on the location of the laboratory shaking device, uncomfortable.

Against this background, it is therefore one aspect of the present invention to provide a shaking platform that is particularly flexible and at the same time can receive and fix in place containers of different sizes. In addition, one aspect is to simplify the handling of the shaking platform.

SUMMARY OF THE INVENTION

One aspect of the present invention is achieved in the case of a shaking platform described at the outset in that the length and width thereof are greater than the length of the holding rods. The length of the holding rods refers to their greatest longitudinal extension, in particular in the longitudinal extension direction of the holding rod, for example substantially from a locking device at one end of the holding rod to a locking device at the other end of the holding rod. In other words, the holding rods are designed in such a way that they only span part of the shaking platform. The holding rods therefore do not run from one side of the shaking platform to the other side of the shaking platform, but already end beforehand. In the event that the shaking platform has a round basic shape, the length of the holding rods is less than their diameter. In this way, it is possible to distribute a plurality of holding devices and thus a plurality of container-receiving spaces on the shaking platform, each of which has holding rods in order to fasten at least one container. In particular, it is possible to arrange the holding devices next to one another or in a staggered manner in the longitudinal extension direction of the holding rods. In addition, it is also possible not only to place the holding devices according to the present invention on the shaking platforms, but also to combine them, for example, with other, conventional holders for laboratory utensils on a shaking platform. Here, too, such a conventional holder can be arranged next to a holding device according to the present invention, for example in the longitudinal extension direction of the holding rods. Each holding device can reliably fix a container in place individually and independently of its size (within a commonly occurring range of container sizes) on the shaking platform.

In principle, the length of the holding rods can be any length as long as it is smaller than the length and the width of the shaking platform. The smaller the length of the holding rods is in comparison to the length and width of the shaking platform, the more holding devices can be individually fastened to the shaking platform and arranged next to one another, in particular in the longitudinal extension direction of the holding rods. In this way, all the more individual container-receiving spaces can be created in which, for example, an individual container of an individual size can reliably be clamped. However, it is particularly preferred for the length and/or the width of the shaking platform to be substantially a multiple of the length of the holding rods. This is intended to express that by multiplying the length of the holding rods by a natural number, one substantially arrives at the length and/or the width of the shaking platform. In other words, this embodiment provides that a plurality of holding devices can be arranged next to one another on the shaking platform, such that substantially the entire length and/or width of the shaking platform is covered. In this way, the available space on the shaking platform can be optimally used. In this case, "substantially" means that the corresponding dimensions do not have to be completely precise. For example, the length of the holding rods could be slightly greater than a divisor of the length and/or width of the shaking platform. In the present case, this is permitted to the extent that, when holding devices are arranged in a row along the length and/or width of the shaking platform, the outer holding devices protrude only slightly beyond the shaking platform, such that operation of the laboratory shaking device is not impaired. Overall, this embodiment makes optimal use of the available space on the shaking platform and securely and reliably fixes a maximum number of containers in place on the shaking platform. It is particularly preferred if the holding device is of a substantially square design, such that the length of the holding rods also substantially corresponds to the length and the width of the holding device. It is also preferred if the shaking platform itself is rectangular or square, such that it can be equipped with square holding devices with optimal use of space.

In principle, each holding device can have exactly one container-receiving space. The holding device is then designed, for example, with exactly two holding rods that are assigned to said container-receiving space. As described above, a plurality of said holding devices can then be arranged on the shaking platform in order to fasten a plurality of containers. Alternatively, however, it is also possible for the holding device to have a plurality of holding rods and a plurality of container-receiving spaces, each of which is delimited by adjacent holding rods. In the present case, a plurality of holding rods means at least three holding rods, while a plurality of container-receiving spaces means at least two container-receiving spaces. For example, a further holding rod for clamping a container can be provided in addition to the holding rods of the paired clamping of a container in the first container-receiving space. However, it is preferred that further container-receiving spaces are each equipped with a pair of holding rods. All of these container-receiving spaces are arranged on the same base plate of the holding device. In other words, a plurality of container-receiving spaces are provided on the same holding device, two holding rods being provided for each container-receiving space, which holding rods delimit the respective container-receiving space. The holding rods are, in particular, exclusively assigned to one container-receiving space, such that each holding rod only contacts a maximum of one container during operation. The holding rods can be arranged on common supports, such that a plurality of holding rods is provided per support, or one support can be provided for each holding rod, such that only one holding rod is provided per support.

According to one embodiment of the present invention, provision is made for the holding device to have a plurality of container-receiving spaces in the direction of the length and/or the width of the shaking platform, in particular adjacent to one another. As described above, a plurality of container-receiving spaces in this case refers to at least two container-receiving spaces. The holding device has at least three container-receiving spaces in the case of an arrangement of the plurality of container-receiving spaces in the direction of the length and width of the shaking platform. By arranging a plurality of container-receiving spaces of a holding device in the direction of the length and/or the width of the shaking platform, a particularly compact arrangement can be achieved overall, such that either a particularly large number of container-receiving spaces can be accommodated on the shaking platform or space is left free for additional equipment.

As described above, it is difficult to fix a plurality of containers in place in a container-receiving space via the holding rods, even if the respective containers are identical in size. Even in this case, individual containers often come loose, as a result of which the difficulties described arise. According to one embodiment of the present invention, provision is therefore made for the shaking platform to have exactly two holding rods per container-receiving space, the container-receiving space being a single emplacement and designed to receive only a single container. In addition, the two holding rods are designed to hold only the one container located on the single emplacement in the container-receiving space. Thus, precisely one container is fixed in place on the shaking platform for each container-receiving space. Each holding device only holds exactly one container. In particular, this means that the shaking platform and, in particular, the holding devices are dimensioned in such a way that only one container used in normal operation of the shaking platform can be accommodated in the container-receiving space. For containers of a size that deviates particularly significantly, different holding devices can be provided that are adapted to the respective container sizes. The shaking platform or the holding devices are therefore adapted to the containers to be placed in the container-receiving space, for example in terms of their size. Holding devices of such different sizes can also be used and arranged on the shaking platform according to the present invention. The advantage of only one container per holding device is that the container can then, regardless of its shape, for example its outer contour, be individually clamped by the holding rods. For example, it does not matter whether the containers are round or square. Regardless of the shape of the container, it can be securely fixed in place by the two holding rods provided exclusively for this container on the holding device.

The supports according to the present invention are designed to support the holding rods. To allow the holding rods to be adjusted in order to clamp the containers, the supports have an adjusting rail. The holding rods can be adjusted along the adjusting rail and are mounted thereon. The arrangement of the adjusting rail itself therefore determines, on the one hand, the direction of movement in which the holding rods are designed to be movable. On the other hand, the arrangement of the adjusting rail determines at what height above the base plate the holding rods are arranged. Containers arranged in the container-receiving space are fixed in place more securely if the holding rods are not arranged too close to the base plate. According to one embodiment of the present invention, provision is therefore made for the adjusting rail to be arranged at the end of a support facing away from the base plate and aligned parallel to the base plate. The adjusting rail delimits the container-receiving space substantially perpendicularly to the holding rods. The adjustment movement of the holding rods along the adjusting rail therefore also runs substantially parallel to the base plate.

To allow this adjustment or displacement of the holding rod along the adjustment rail, it can be provided, for example, that the adjusting rail has a slot in which a locking device of the holding rod engages and along which the holding rod is adjustably mounted. The slot in the adjusting rail forms a link guide for the locking device on the holding rod. In this way, an adjustability and at the same time a fixability of the holding rods can be realized in a particularly simple manner. The slot extends along the adjusting rail. For example, it is preferred that the slot extends along at least 50%, preferably along at least 75% and particularly preferably along at least 90% of the longitudinal extension of the adjusting rail. The greater the extension of the slot along the adjusting rail, the greater the maximum adjustment path of the holding rod, as a result of which the flexibility of the holding device increases. According to an alternative embodiment of the present invention, provision is made for the adjusting rail to have two slots that are formed separately from each other and are spaced apart from each other along a longitudinal direction of the adjusting rail. The features already described apply to both slots. In particular, the two slots are of the same design, in particular such that the adjusting rail is designed to be mirror-symmetrical with respect to the center of the longitudinal extension direction thereof. Together, the two slots preferably extend along at least 50%, more preferably along at least 70% and particularly preferably along at least 90% of the longitudinal extension direction of the adjusting rail. A single slot thus extends along at least 25%, preferably along at least 35% and particularly preferably along at least 45% of the longitudinal extension of the adjusting rail. A locking device of a holding rod engages in each of the two slots, the respective holding rod being adjustably mounted along the respective slot. In other words, the adjusting rail is designed such that one end of two holding rods can be adjustably mounted thereon. An adjusting rail of a support can therefore adjustably support both holding rods delimiting the container-receiving space. The holding rods each have their own slot, in which they engage, in particular, with the respective locking device. The distance between the two holding rods can therefore be adjusted along the adjusting rail and along the slots. When the shaking platform is used, the holding rods are moved towards each other to such an extent that they clamp the container to be held between them in the container-receiving space and thus hold it in place.

In the corresponding position in which the holding rods are in contact with the container, the holding rods must be fixed against further adjustment on the adjusting rail, which is implemented via the locking device. For this purpose, the locking device may comprise a clamping device with which the holding rod can be clamped to the adjusting rail via a clamping knob. The clamping knob is a handle that can be rotated by the operator, via which an operator can clamp the holding rod with respect to the adjusting rail, which results in the holding rod being detachably fastened in the respective position on the adjusting rail. The clamping device therefore ensures a frictional connection between the holding rod and the adjusting rail, which frictional connection prevents further adjustment of the adjusting rail and is, in particular, also able to absorb inertial forces from the container fixed in the container-receiving space without becoming detached. For this purpose, the clamping device can, in principle, have different embodiments. It is preferred for the clamping device to comprise a threaded bolt in a threaded hole, which are designed to adjust the distance between the clamping knob and the holding rod when the clamping knob is rotated. In other words, the threaded bolt is screwed into or out of the threaded hole. The threaded bolt can, for example, be designed to be rotationally fixed, for example in one piece, with the clamping knob, while the threaded hole is located in the holding rod. However, an inverted arrangement is also possible, in which the threaded bolt is arranged on the holding rod and the clamping knob has the threaded hole. Importantly, rotation of the clamping knob results in the threaded bolt being screwed into or screwed out of the threaded hole, as a result of which the distance between the clamping knob and the holding rod decreases or increases. The threaded bolt is passed through the slot in the adjusting rail in such a way that the holding rod is arranged on one side of the adjusting rail and the clamping knob on the other side of the adjusting rail. In this way, the clamping knob can be rotated until the distance between the clamping knob and the holding rod corresponds to the thickness of the adjusting rail. The clamping knob and the holding rod are then pressed against the adjusting rail from two opposite sides, and the frictional connection is thereby achieved. According to one embodiment of the present invention, provision is made for the clamping knob to be located vertically above the adjusting rail and for the holding rod to be located vertically below the adjusting rail. In this way, the clamping knob protrudes vertically upwards from the adjusting rail and is accessible to an operator from above. Even when a plurality of holding devices are arranged side by side, an operator can easily reach the locking device and, in particular, the clamping knob to move the holding rods or to prevent displacement thereof via the frictional connection or to release the frictional connection. A clamping knob that can be reached from above also prevents an operator from having to operate the locking device from the side of the laboratory shaking device. Regardless of where they are placed in the room, for example near other equipment or a wall, the locking device and, in particular, the clamping knob can be easily reached and conveniently operated according to the present invention.

Particularly safe guidance of the holding rods and particularly secure fastening of the container are achieved when, according to one embodiment of the present invention, both supports each have an adjusting rail and the holding rods are mounted at both ends on one of the adjusting rails. In particular, the two adjusting rails each have two slots, as described above. In this way, each of the four ends of the two holding rods can engage in one of the slots with a respective locking device and can be adjusted along the slot and the adjusting rail. In this embodiment, the container-receiving space is therefore delimited in addition to the base plate by the two supports or the adjusting rails and substantially perpendicularly to said supports or adjusting rails by the holding rods. In one embodiment, the container-receiving space to be delimited in a rectangular shape in the horizontal plane by the two adjusting rails and the two holding rods, the adjusting rail and the holding rods being located opposite one another.

According to one embodiment of the present invention, provision is made for the adjusting rail to protrude inward from the support, towards the container-receiving space. The container-receiving space is therefore delimited by the adjusting rail. The adjusting rail is closer to the container-receiving space than the support. Alternatively, it can be provided that the adjusting rail protrudes outward from the support, away from the container-receiving space. In this case, the container-receiving space is delimited by the support, which is closer to the container-receiving space than the adjusting rail. In addition, in both embodiments, the adjusting rail having the slot or slots is extended flat in the horizontal plane. In other words, the adjusting rail is arranged substantially perpendicular to the supports, which in turn protrude perpendicularly from the base plate. The supports themselves can, for example, be plate-shaped, i.e., extended flat in a vertical plane. For example, they form sidewalls. However, the supports can also take on other forms and can, for example, have a single strut or a plurality of struts that protrude from the base plate and carry the adjusting rail. For example, the supports and the adjusting rail, and, in particular, also the base plate, can be formed in one piece with each other. They are formed, for example, from a metal sheet or a plastic plate that is bent substantially perpendicularly at the edge of the base plate in order to form the supports, the supports in turn being bent substantially perpendicularly at their ends facing away from the base plate to form the adjusting rails.

In one embodiment of the present invention, it can now be provided that, in the support, in particular in a flat support designed as a sidewall, a further slot is arranged, through which the holding rod protrudes onto the side of the support facing away from the container-receiving space. This further slot is preferably designed to be as long as the respective slot into which the locking device of the holding rod engages at this end of the holding rod. The holding rod is thus also moved in the slot on the support when the locking device is adjusted in the slot on the adjusting rail. The adjusting rail and the locking device are also arranged on the side of the support facing away from the container-receiving space. The adjusting rail thus protrudes outward from the support, away from the container-receiving space. One end of the holding rod in turn penetrates the support through the slot arranged in the support, such that the locking device on the side of the support facing away from the container-receiving space is also guided through the slot of the adjusting rail. In this way, no components of the holding device, in particular the adjusting rail and the locking device, protrude into the container-receiving space or restrict the extension thereof to the sides of the supports. This design is therefore always preferred when the holding device is designed to accommodate particularly large containers. While the slot in the adjusting rail is arranged substantially horizontally, the slot in the support is arranged substantially vertically. The slot in the support can now be used in addition or as an alternative to clamping the holding rod using the adjusting rail to fix the holding rod in a position of the holding rod along the adjusting rail. Thus, it is preferred for the slot to be arranged in such a way that the holding rod can be clamped to the edges of the slot via the locking device. In other words, by adjusting the distance between the holding rod and the clamping knob via the clamping device, a frictional connection is established between the holding rod and the slot in the support. In this case, the distance between the clamping knob and the holding rod can be increased, for example, in order to clamp the holding rod with the vertically lower edge of the slot in the support. For this purpose, a further stop is provided on the clamping knob, with which stop said clamping knob lies against the adjusting rail and can apply a counterforce for the corresponding clamping of the holding rod. Said stop can, for example, encompass the adjusting rail through the slot and can thus be arranged on the side of the adjusting rail opposite the clamping knob. In addition, it is also possible to shorten the distance between the clamping knob and the holding rod in such a way that a frictional connection is created between the holding rod and the vertically upper edge of the slot. This embodiment is therefore particularly convenient because the holding rod is always clamped onto the slot in the support, regardless of the direction in which an operator turns the clamping knob. If the holding rod is mounted loosely in the slot and can be moved, an operator can turn the clamping knob in any direction. After a sufficient change in the distance between the clamping knob and the holding rod, there is always a frictional connection and the holding rod is therefore fixed in place with respect to the adjusting rail.

In principle, the holding rods can consist of any suitable material. For example, holding rods made of plastic are possible. However, holding rods made of metal are preferred because this provides increased resistance to breakage and thus increased stability. To prevent the holding rod from damaging the containers as a result of being in contact with the containers, it is particularly preferred that the holding rod, in particular both holding rods, have a holding part and a fastening part, the holding part having a shock-absorbing casing and being designed at least in part to contact a container in the container-receiving space, while the fastening part is designed without a casing. The holding part can thus be encased, for example, with a soft or elastic material, for example a plastic material such as caoutchouc, rubber or the like. The holding part extends over a large part of the length of the holding rod, in particular, for example, over at least 70%, preferably over at least 80% and particularly preferably over at least 90% of the length of the holding rod. In particular, only the ends of the holding rod are free of the casing, in particular those regions of the holding rod that are designed to clamp onto the adjusting rail and/or the edges of the slot of the supports. Due to the casing, no damage can occur to the containers, even if the holding rods, in particular the holding parts of the holding rods, make firm contact therewith.

The above described aspect is also achieved with an adjustable holding device for use with a shaking platform according to the preceding embodiments. The holding device may comprise a base plate having a fastening device for fastening the holding device on the shaking platform, at least two supports that protrude from the base plate and form a container-receiving space arranged between the supports, and at least two holding rods carried by the supports and running substantially parallel to the shaking platform, which holding rods delimit the container-receiving space and whose distance from one another can be adjusted via an adjusting rail. In addition, it is provided that the container-receiving space is a single emplacement and designed to receive only a single container, and that the two holding rods are designed to hold only the one container located on the single emplacement in the container-receiving space. All of the above-described features, effects and advantages of the shaking platform according to the present invention also apply by association to the holding device according to the present invention and vice versa. Only to avoid repetition, reference is therefore made to the above embodiments.

Finally, the above described aspect at the outset can also be achieved with a laboratory shaking device, in particular a laboratory shaker or a shaking incubator, having a shaking platform or a holding device according to the preceding embodiments. All of the above-described features, effects and advantages of the shaking platform according to the present invention and the holding device according to the present invention also apply to the laboratory shaking device by association and vice versa. Here, too, reference is made to the preceding embodiments only to avoid repetition.

BRIEF DESCRIPTION OF THE DRAWINGS

The present invention is described in more detail below with reference to the embodiments shown in the figures, without the present invention being restricted to these embodiments. Schematically, in the drawings.

Identical or identically-acting components are numbered with the same reference signs in the figures. Repeated components are not identified separately in each figure.

DETAILED DESCRIPTION OF THE INVENTION

Figure 1:
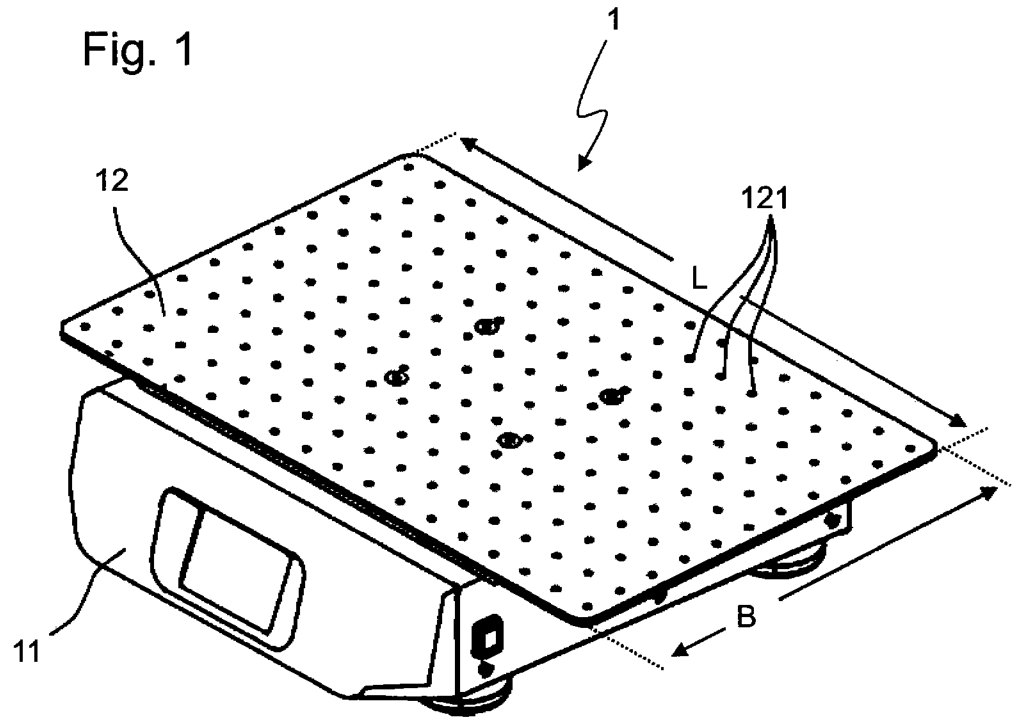
FIG. 1 shows a laboratory shaker with a shaking platform.

FIG. 1 shows a laboratory shaker 1 having a housing part 11 and a shaking platform 12. In the housing part 11, for example, control electronics and a drive motor are accommodated, which are used to set the shaking platform 12 in shaking movements when the laboratory shaker 1 is in operation. In this way, for example, liquids that are in containers that are placed on the shaking platform 12 are mixed and kept in movement. For fastening a holding device according to the present invention, the shaking platform 12 has fastening points 121, for example bores, through which screws can be inserted.

Figure 2:
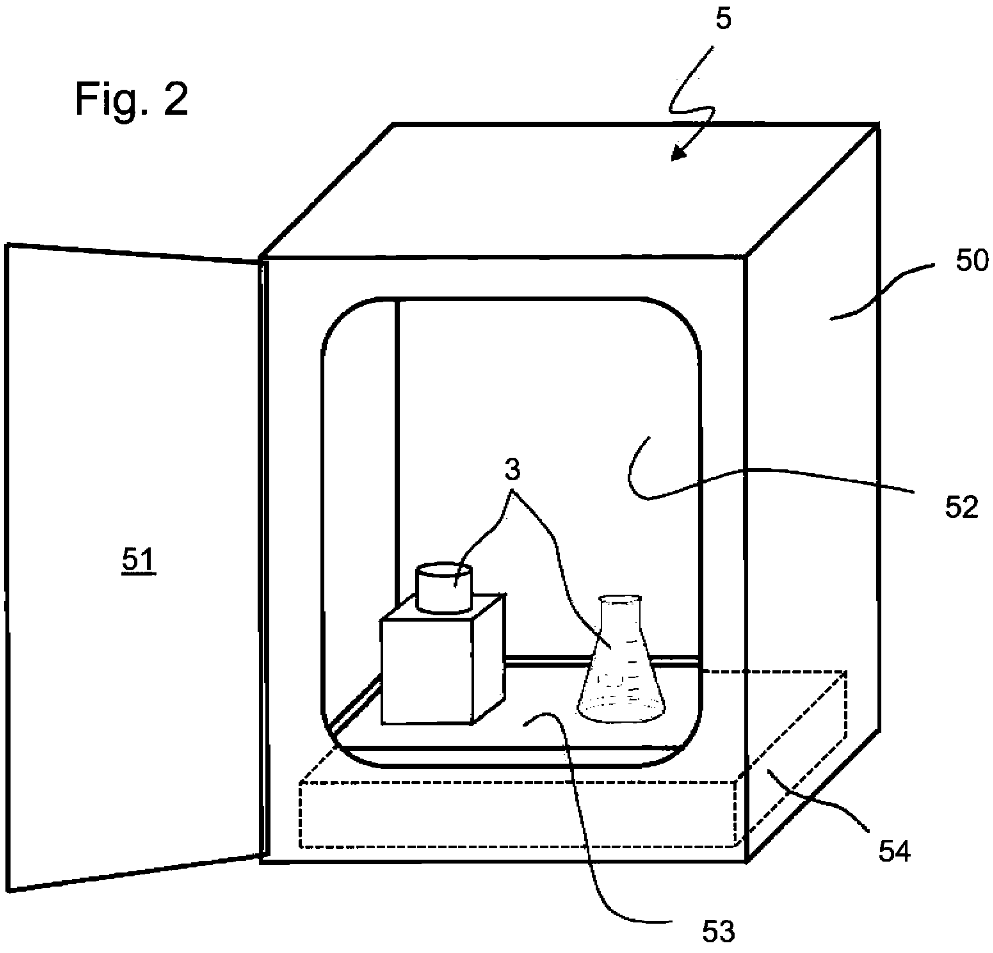
FIG. 2 shows a shaking incubator with a shaking platform.

FIG. 2 shows a shaking incubator 5 that differs from the laboratory shaker 1 according to FIG. 1 substantially by a housing 50 that surrounds an interior space 52 that can be closed by a door 51, in which interior space a shaking platform 53 is arranged. Fastening points for holding devices or similar structures are also provided on the shaking platform 53 (not shown separately in this case). With the holding devices, which are not shown separately here for the sake of clarity, containers 3, such as square or round bottles, Erlenmeyer flasks or other vessels, can be fixed in place on the shaking platform 53. The shaking platform 53 is moved by means of a drive apparatus 54 arranged in this case in the floor region of the incubator. In the interior space 52, a desired temperature and/or a desired composition of the interior atmosphere, such as, for example, a predetermined air humidity, can be set in a manner known per se. To set up the sample vessels, instead of one, there can also be a plurality of shaking platforms 53 in the interior space, which shaking platforms are also set in motion by means of the drive apparatus 54.

The two shaking platforms 12, 53 each have a rectangular basic shape and a length L and a width B (see, FIG. 1). In principle, the shaking platforms 12, 53 could also be square, which would mean that the length L and the width B would be the same. However, this does not have to be the case. The present embodiments also apply in an analogous manner to round shaking platforms 12, 53, in which the length L and the width B are to be replaced by the diameter of the corresponding shaking platforms 12, 53.

Figure 3:
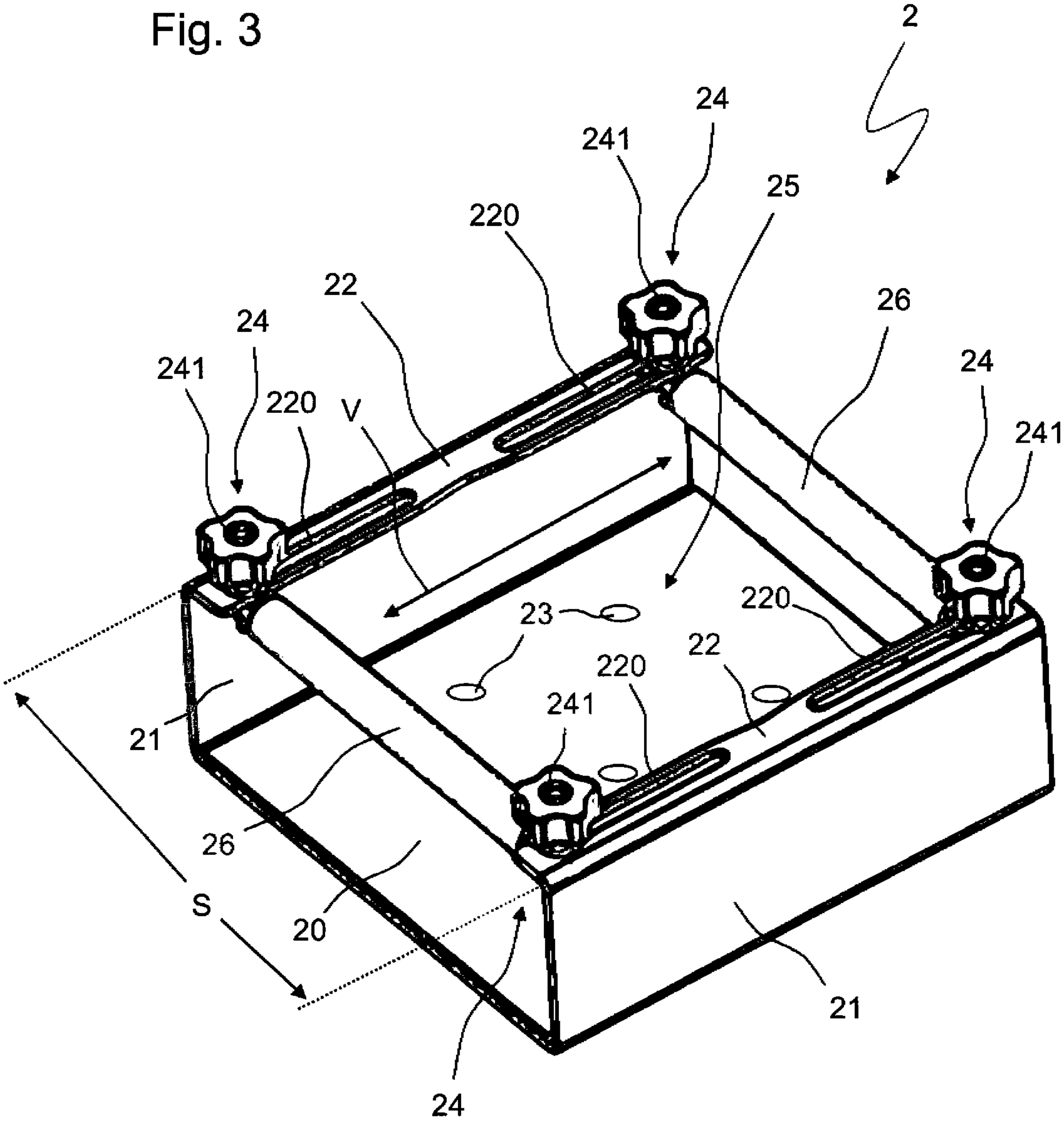
FIG. 3 shows a holding device according to the present invention.

FIG. 3 shows a holding device 2. The holding device 2 has a base plate 20 from which two supports 21 designed as sidewalls in the embodiment shown protrude substantially vertically upward. The base plate 20 also has fastening devices 23, for example bores through which screws can be inserted, with which the holding device 2 can be fastened on a shaking platform 12, 53, in particular, in cooperation with the fastening points 121 on the shaking platform 12, 53.

An adjusting rail 22 is arranged on each of the supports 21. Each of the two adjusting rails 22 has two slots 220 that extend along the longitudinal extension direction of the adjusting rails 22. The slots 220 each span somewhat less than half of the adjusting rail 22 and run from a central region of the adjusting rail 22 to just before its outer ends. The adjusting rail 22 having the slots 220 is aligned substantially horizontally or parallel with respect to the base plate 20. One end of a holding rod 26 is mounted in each of the slots 220 via a locking device 24 in such a way that the holding rod 26 or the locking device 24 can be moved along the slots 220 and thus along the adjusting rail 22. In particular, the distance between the two holding rods 26 can be changed in or against the direction of adjustment V.

The holding device 2 forms a container-receiving space 25 on the base plate 20 and between the supports 21 or between the adjusting rails 22 and the holding rods 26. The container-receiving space 25 is designed to receive a container 3. In particular, the container-receiving space 25 is designed to receive only a single container 3. The size of the container-receiving space 25 or the holding device 2 is therefore adapted to the size of the containers 3 usually used, such that precisely one of these containers 3 can be received in the container-receiving space 25. A container 3 stored in the container-receiving space 25 can be fixed in place in the holding device 2 in that the two holding rods 26 are moved towards one another along their adjustable mounting on the adjusting rail 22 until they rest against the container 3 and clamp it between them. The two holding rods 26 are therefore also designed for the sole purpose of fastening a single container 3 in the container-receiving space 25. Overall, the container-receiving space 25 is thus designed as a single emplacement. In addition, the holding rods 26 have a length S that is smaller than the length L and the width B of the shaking platform 12, 53. This is described in more detail below. The length S substantially corresponds to the distance between the two supports 21.

Figure 4:
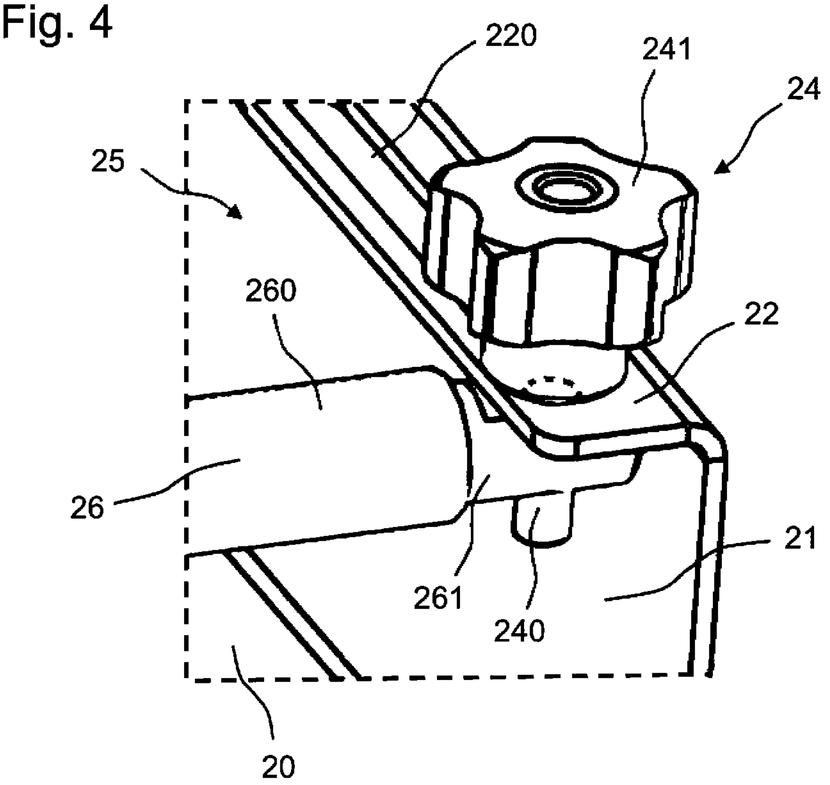
FIG. 4 shows a first embodiment of an adjusting rail and a locking device.

FIG. 4 shows a first embodiment of the adjusting rail 22 and the locking device 24. In the embodiment according to FIG. 4, the adjusting rail 22 at the upper end of the support 21 is in the form of a tab that is bent inward, i.e., in the direction of the container-receiving space 25. The adjusting rail 22 runs substantially parallel to the base plate 20 and is substantially perpendicular to the support 21. The end of the holding rod 26 shown in FIG. 4 is mounted in the slot 220 of the adjusting rail 22 via the locking device 24. The locking device 24 comprises, in particular, a clamping knob 241 and a clamping device 240. The clamping device 240 in turn comprises a threaded bolt, which is arranged on the clamping knob 241 in the embodiment shown, and a threaded hole in the end of the holding rod 26. The threaded bolt of the clamping knob 241 is pushed through the slot 220 and connects the clamping knob 241 to the holding rod 26 in such a way that the clamping knob 241 is arranged on the vertically upper side of the adjusting rail 22 and the end of the holding rod 26 is arranged on the vertically lower side of the adjusting rail 22. In other words, the end of the holding rod 26 is arranged on the opposite side of the clamping knob 241 with respect to the adjusting rail 22. The threaded bolt is screwed into the threaded hole of the holding rod 26 and is connected to the clamping knob 241 in a rotationally fixed manner. If an operator turns the clamping knob 241, the threaded bolt is either screwed into or out of the threaded hole, depending on the direction of rotation. This changes the distance between the clamping knob 241 and the holding rod 26. If the distance between the clamping knob 241 and the holding rod 26 is reduced substantially down to the thickness of the adjusting rail 22, a frictional connection is created between the clamping knob 241, the adjusting rail 22 and the holding rod 26. This frictional connection can be adjusted to a greater or lesser extent by tightening the clamping knob 241 to a greater or lesser extent and prevents further adjustment of the holding rod 26 along the adjusting rail 22. The container 3 is fixed in place in the container-receiving space 25 by a corresponding fastening of the holding rods 26 while said holding rods rest on opposite sides of a container 3.

Figure 5:
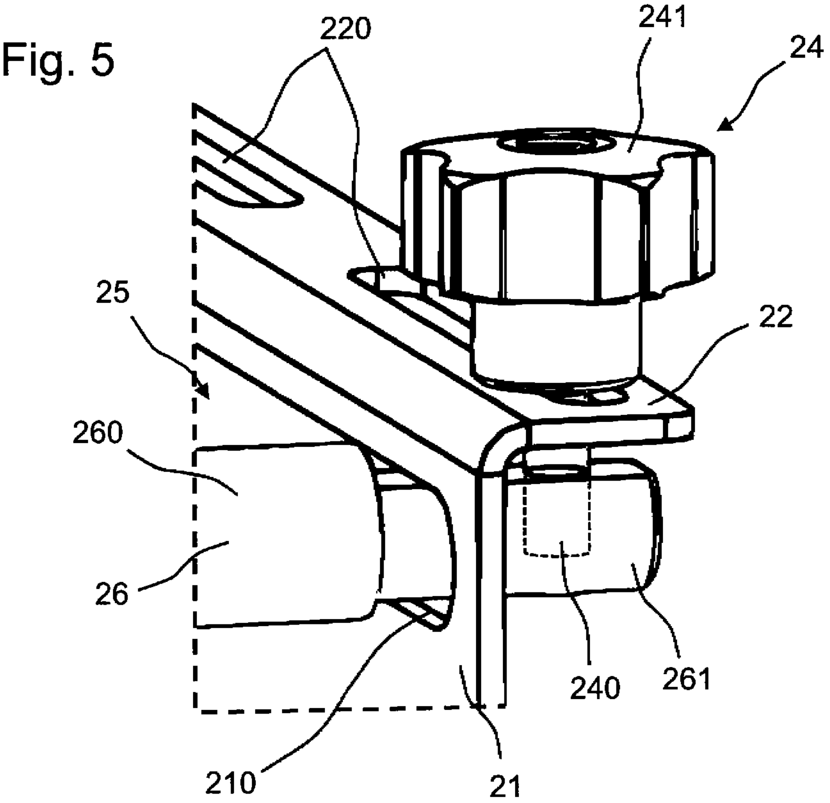
FIG. 5 shows a second embodiment of an adjusting rail and a locking device.

A second embodiment of the adjusting rail 22 of the locking device 24 is shown in FIG. 5. A substantial difference from the previous embodiment is that the adjusting rail 22 protrudes away from the container-receiving space 25 at the vertically upper end of the support 21 and thus on the outside of the holding device 2. The container-receiving space 25 is therefore not delimited by the adjusting rail 22 but by the support 21. The support 21 also has a further slot 210 that extends parallel to the adjusting rail 22. The end of the holding rod 26 extends through the slot 210 and through the support 21 to the side of the support 21 facing away from the container-receiving space 25. The holding rod 26 therefore ends vertically under the slot 220 of the adjusting rail 22, as in the previous embodiment, but this time on the outside of the support 21. The locking device 24 is therefore also on this side of the support 21. Said locking device again includes a clamping device 240 and a clamping knob 241, as already described above. Again, by rotating the clamping knob 241, an operator can change the distance between the clamping knob 241 and the holding rod 26. In the embodiment according to FIG. 5, however, the slot 210 and the locking device 24 are designed in such a way that the holding rod 26 comes to rest on the vertical upper edge of the slot 210 before the adjusting rail 22 can be clamped between the clamping knob 241 and the holding rod 26. If the distance between the clamping knob 241 and the holding rod 26 is reduced sufficiently by rotating the clamping knob 241, a frictional connection is created between the holding rod 26, the vertical upper edge of the slot 210 of the support 21 and at the same time also between the clamping knob 241 and the adjusting rail 22. If the clamping knob 241 is also designed with an additional stop for the adjusting rail 22, which stop prevents the clamping knob 241 from being lifted vertically upwards off the adjusting rail 22, increasing the distance between the clamping knob 241 and the holding rod 26 can also establish a frictional connection between the holding rod 26 and the vertically lower edge of the slot 210. This embodiment, in which the adjusting rail 22 protrudes outward from the holding device 2, is particularly preferred, for example, when particularly large containers 3 are to be fastened in the holding device 2.

It can also be seen from FIGS. 4 and 5 that the holding rods 26 have a holding part 260 and a fastening part 261. The holding part 260 is designed to bring the holding rod 26 into contact with a container 3 mounted in the container-receiving space 25. For this purpose, the holding part 260 is provided with a soft or elastic casing, for example a casing made of rubber or caoutchouc. In this way, damage to the containers 3 through contact with the holding rods 26 is reliably prevented. The casing extends over the entire holding rod 26, except for the end regions thereof, the fastening parts 261. The fastening parts 261 are, in particular, those regions of the holding rod 26 that are designed to establish a frictional connection with the support 21 or the adjusting rail 22. In order to make the frictional connection as reliable as possible, the holding rod 26 is designed without a casing in the fastening part 261.

Figure 6:
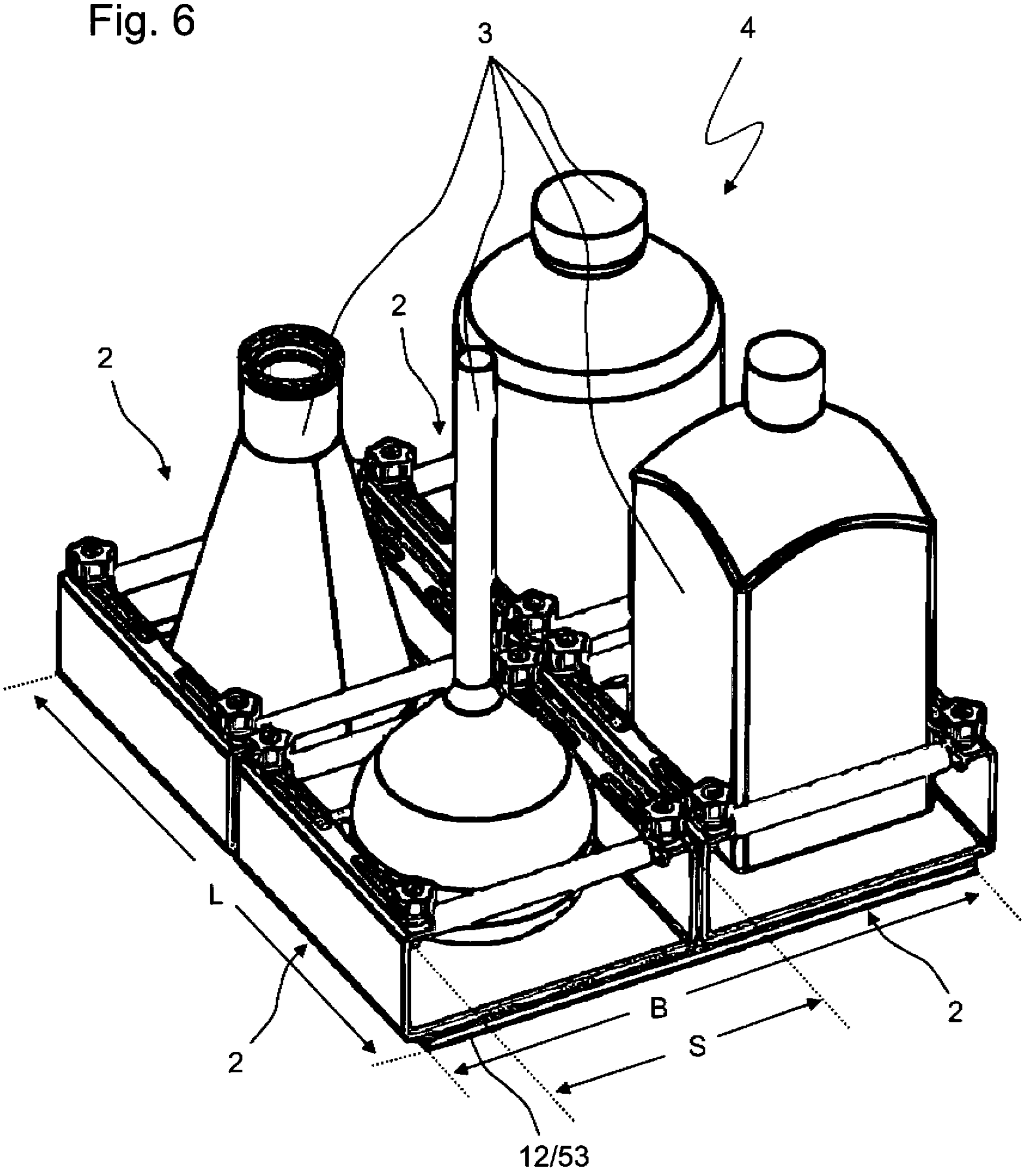
FIG. 6 shows a shaking platform fully loaded with holding devices.

In FIG. 6, the reference sign 4 designates a shaking platform 12, 53 that is fully equipped with holding devices 2 over its entire surface, which each fasten containers 3 of different shapes and sizes on the shaking platform 12, 53. In the embodiment shown, the length S of the holding rods 26 is substantially half the width B of the shaking platform 12, 53. In addition, the dimension of the holding device 2 perpendicular to the holding rods 26 corresponds substantially to half the length L of the shaking platform 12, 53, such that the shaking platform 12, 53 is completely filled by the four holding devices 2 shown and the space available on the shaking platform 12, 53 is used optimally. FIG. 6 illustrates that completely different containers 3 can be securely fastened on the shaking platform 12, 53 using the holding devices 2 according to the present invention. Each individual container 3 has its own single emplacement in one of the holding devices 2 and is fixed in place by two holding rods 26 that are provided exclusively for this one container 3. Each of the containers 3 therefore has its own holding device 2 and is reliably and securely fastened. Another advantage of the present invention lies in its optional modularity. Instead of the four holding devices 2 shown, only one, two or three holding devices 2 could be arranged on the shaking platform 12, 53. Because the holding rods 26 do not extend over the entire length L and width B of the shaking platform 12, 53, the remaining space on the shaking platform 12, 53 could be used by other equipment such as special holders for other laboratory utensils.

Overall, it is therefore possible with the present invention to provide particularly flexible and secure fastening of containers 3 on a shaking platform 12, 53. Independently of their respective size, the containers 3 can be fixed in place individually in a holding device 2 provided solely for them. In addition, the handling of the holding devices 2 according to the present invention is particularly simple because an operator can reach the clamping knobs 241, which protrude vertically upward, particularly easily and conveniently.

What is claimed is:

1. A shaking platform for a laboratory shaking device having an adjustable holding device for fastening at least one container, the shaking platform having a length and a width, and the adjustable holding device comprising:

a base plate having a fastening device for fastening the adjustable holding device on the shaking platform;

at least two support walls that each extend from the base plate and that define a container-receiving space arranged between the at least two support walls, each support wall extending in a direction and comprising an adjusting rail that projects from the support wall and that extends parallel to the support wall, the adjusting rail having a slot formed therein, the slot extending parallel to the support wall; and at least two holding rods carried by the at least two support walls and running substantially parallel to the shaking platform, the at least two holding rods delimiting the container-receiving space wherein a distance from one of the at least two holding rods to another of the at least two holding rods is adjustable via the adjusting rails, wherein the length and the width of the shaking platform are greater than a length of the at least two holding rods; and at least two locking devices, wherein each of the at least two locking devices extending through the slot of an adjusting rail associated with that respective locking device, wherein each of the at least two locking devices comprises a clamping device with which a respective one of the at least two holding rods is clampable to a respective one of the at least two adjusting rails via a respective clamping knob, and wherein each clamping knob protrudes vertically upwards from a respective one of the at least two adjusting rails and is accessible to an operator from above.

2. The shaking platform according to claim 1, wherein the length and/or the width of the shaking platform is substantially a multiple of the length of the at least two holding rods.

3. The shaking platform according to claim 1, wherein the adjustable holding device defines a plurality of container-receiving spaces, each of which plurality of container-receiving spaces is delimited by adjacent holding rods.

4. The shaking platform according to claim 3, wherein the plurality of container-receiving spaces are placed along in a direction of the length and/or the width of the shaking platform.

5. The shaking platform according to claim 1, wherein the shaking platform has exactly two holding rods per container-receiving space, the container-receiving space being a single emplacement and designed to receive only a single container, and in that the two holding rods are designed to hold only the one container standing on the single emplacement in the container-receiving space.

6. The shaking platform according to claim 1, wherein the at least two adjusting rails are arranged at respective ends of the at least two support walls facing away from the base plate and are aligned parallel to the base plate.

7. The shaking platform according to claim 1, wherein the shaking platform includes a feature selected from the group consisting of:

(1) each of the at least two adjusting rails has a slot in which a respective one of the at least two locking devices of the respective one of the at least two holding rods engages and along which the respective one of the at least two holding rods is adjustably mounted;

(2) each of the at least two adjusting rails has two slots that are formed separately from each other and are spaced apart from each other along a longitudinal direction of a respective one of the at least two adjusting rails;

a locking device of a first adjusting rail engaging in a first of the two slots and a locking device of a second adjusting rail engaging in a second of the two slots, a respective holding rod being adjustably mounted along the respective adjusting rail's respective slot; or (3) each of the clamping devices comprises a threaded bolt in a threaded hole, which is designed to adjust the distance between the respective clamping knob and the respective holding rod when the clamping knob is rotated.

8. The shaking platform according to claim 1, wherein the at least two support walls each comprise a respective adjusting rail of the at least two adjusting rails and the at least two holding rods are mounted at respective ends of a respective adjusting rail.

9. The shaking platform according to claim 1, wherein the shaking platform includes a feature selected from the group consisting of:

(1) each of the at least two adjusting rails is associated with a respective support wall and protrudes inward from the respective support wall, towards the container-receiving space;

(2) each of the at least two adjusting rails protrudes is associated with a respective support wall and protrudes outward from the respective support wall, away from the container-receiving space;

(3) each of the at least two adjusting rails has a slot in which a respective one of the at least two locking devices of the respective one of the at least two holding rods engages and along which the respective one of the at least two holding rods is adjustably mounted, and an additional slot is arranged in the respective support wall, through which additional slot the respective holding rod protrudes onto a side of the support wall facing away from the container-receiving space, the respective adjusting rail and the respective locking device also being arranged on the side of the support wall facing away from the container-receiving space; or (4) each of the at least two adjusting rails has a slot in which a respective one of the at least two locking devices of the respective one of the at least two holding rods engages and along which the respective one of the at least two holding rods is adjustably mounted, and an additional slot arranged in such a way that the respective holding rod is clampable to edges of the additional slot via the respective locking device.

10. The shaking platform according to claim 1, wherein each of the at least two holding rods has a holding part and a fastening part, the holding part having a shock-absorbing casing and being designed at least in part for contacting a container in the container-receiving space, while the fastening part is designed without a casing.

11. An adjustable holding device for use with a shaking platform for a laboratory shaking device, the adjustable holding device comprising:

a base plate having a fastening device for fastening the adjustable holding device on the shaking platform;

at least two support walls that protrude from the base plate and that form a container-receiving space arranged between the at least two support walls; and at least two holding rods carried by the at least two support walls and running substantially parallel to the shaking platform, the at least two holding rods delimiting the container-receiving space wherein a distance from one another is adjustable via at least two adjusting rails, wherein the container-receiving space is a single emplacement and designed to receive only a single container, wherein the at least two holding rods are designed to hold only the single container located on the single emplacement in the container-receiving space, wherein at least two locking devices each comprising a clamping device with which the at least two holding rods are clampable to the at least two adjusting rails via a respective clamping knob, and further wherein each clamping knob protrudes vertically upwards from a respective one of the at least two adjusting rails and is accessible to an operator from above.

12. A laboratory shaking device having a shaking platform or a holding device according to claim 1.

13. The laboratory shaking device according to claim 12, wherein the laboratory shaking device comprises a laboratory shaker or shaking incubator.

* * * * *